United States Patent [19]
Yamamoto et al.

[11] Patent Number: 5,990,272
[45] Date of Patent: *Nov. 23, 1999

[54] METHOD OF TREATING POLYOLEFIN

[75] Inventors: Ryoichi Yamamoto; Satoru Ohtani, both of Ichihara; Hiroshi Nishikawa; Teruhisa Kojima, both of Waki-cho, all of Japan

[73] Assignee: Mitsui Chemicals, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,069

[22] Filed: May 21, 1997

[30] Foreign Application Priority Data

May 21, 1996 [JP] Japan ..................................... 8-126008

[51] Int. Cl.$^6$ ........................................................ C08F 6/02
[52] U.S. Cl. .......................... 528/499; 528/483; 528/491; 528/494; 528/495; 528/496; 528/502 R; 528/502 F; 528/503
[58] Field of Search ..................................... 528/483, 496, 528/499, 494, 491, 495, 490, 502 R, 502 F, 503

[56] References Cited

U.S. PATENT DOCUMENTS

| | | |
|---|---|---|
| 3,931,130 | 1/1976 | Beining . |
| 4,029,877 | 6/1977 | Yoshiura et al. . |
| 5,340,786 | 8/1994 | Tsutsui et al. . |
| 5,387,660 | 2/1995 | Doyle . |
| 5,428,127 | 6/1995 | Asanuma et al. . |
| 5,498,809 | 3/1996 | Emert et al. ............................ 585/13 |

FOREIGN PATENT DOCUMENTS

| | | | |
|---|---|---|---|
| 2814572 | 10/1979 | Germany . | |
| 46-4992 | 2/1971 | Japan ..................................... 528/496 |

OTHER PUBLICATIONS

Abstract of Japan Laid–Open Pat. Publ. No. 9–52918 (Feb. 25, 1997).

*Primary Examiner*—Fred Teskin
*Attorney, Agent, or Firm*—Sherman and Shalloway

[57] ABSTRACT

A method of treating polyolefin comprises (i) a ligand-decomposition step of contacting polyolefin, which is obtained by the use of a transition metal compound containing ligands having cyclopentadienyl skeleton, with a ligand decomposer, such as water, oxygen, alcohol, alkylene oxide or peroxide, to decompose the ligands contained in the polyolefin, and (ii) a ligand-removal step of heating the polyolefin contacted with the ligand decomposer to remove the decomposed ligands from the polyolefin. According to this method, the residual ligands having cyclopentadienyl skeleton, which are contained in the polyolefin produced by the use of a transition metal compound containing ligands having cyclopentadienyl skeleton, are decomposed and removed from the polyolefin, whereby polyolefin diminished in odor development in the molding process can be obtained.

25 Claims, 1 Drawing Sheet

5,990,272

METHOD OF TREATING POLYOLEFIN

FIELD OF THE INVENTION

The present invention relates to a method of treating polyolefin, and more particularly to a method of removing residual ligands having cyclopentadienyl skeleton from polyolefin obtained by the use of a transition metal compound containing ligands having cyclopentadienyl skeleton.

BACKGROUND OF THE INVENTION

Processes for preparing polyolefins using transition metal compounds such as metallocene compounds have been recently paid much attention. The transition metal compounds are characterized in that when they are used as a catalyst component for olefin polymerization, they exhibit a high polymerization activity and the resulting polymer has a narrow molecular weight distribution.

Meanwhile, in polyolefins which are obtained by the use of such transition metal compounds as mentioned above, the transition metal compounds used as the catalyst component are contained. Ligands of the transition metal compounds are residual groups of cyclic compounds having conjugated double bond of cyclopentadienyl skeleton, so that they sometimes become sources of odor development when they are thermally processed, and besides the odor development may have bad influences on flavor, etc. in a field of foods where delicate smell or taste is considered as important. Therefore, the polyolefins obtained by the use of the transition metal compounds are sometimes restricted in their uses.

As a method of treating resins to inhibit odor development of the resins in the molding process, for example, a method of drying resin pellets over an inert gas to remove the ligands has been proposed in Japanese Patent Laid-Open Publication No. 157486/1975, or a method of treating resin pellets with a hot water column to remove the ligands has been proposed in Japanese Patent Publication No. 18521/1982.

By the conventional technique, however, odor development cannot be sufficiently inhibited because of insufficient removal of the ligands, or the removal of the ligands needs much time or large energy.

Under such circumstances as described above, the present inventors have earnestly studied, and as a result, they have found that the ligands, which are sources of odor development, can be efficiently removed by the method comprising the steps of contacting polyolefin with a ligand decomposer such as water, alcohol or the like to decompose the residual ligands contained in the polyolefin and heating the polyolefin contacted with the ligand decomposer. Based on the finding, the present invention has been accomplished.

OBJECT OF THE INVENTION

It is an object of the present invention to provide a method of treating polyolefin, by which residual ligands having cyclopentadienyl skeleton, which are contained in polyolefin obtained by the use of a transition metal compound containing ligands having cyclopentadienyl skeleton, can be decomposed and removed from the polyolefin to thereby obtain polyolefin diminished in odor development in the molding process.

SUMMARY OF THE INVENTION

The method of treating polyolefin according to the present invention comprises:

(i) a step of contacting polyolefin, which is obtained by the use of a transition metal compound, with a ligand decomposer, and

(11) a step of heating the polyolefin contacted with the ligand decomposer.

Particularly, the method of treating polyolefin according to the invention comprises:

(i) a ligand-decomposition step of contacting polyolefin, which is obtained by the use of a transition metal compound containing ligands having cyclopentadienyl skeleton, with a ligand decomposer to decompose the ligands contained in the polyolefin, and (ii) a ligand-removal step of heating the polyolefin contacted with the ligand decomposer to remove the decomposed ligands from the polyolefin.

The ligand decomposer is at least one compound selected from the group consisting of water, oxygen, alcohol, alkylene oxide and peroxide.

The mean particle diameter of the polyolefin in the ligand-decomposition step is desirably in the range of 50 to 5,000 $\mu$m. In the ligand-decomposition step, the polyolefin is contacted with, for example, a gaseous stream containing the ligand decomposer.

The heating temperature in the ligand-removal step is not lower than the crystallization temperature of the polyolefin and lower than the decomposition temperature of the polyolefin, in the event that the polyolefin has a crystallinity of not less than 40%; and the heating temperature in said step is not lower than a temperature obtained by subtracting 15° C. from the melting point of the polyolefin and lower than the decomposition temperature of the polyolefin, in the event that the polyolefin has a crystallinity of less than 40%.

Further, the heating temperature in the ligand-removal step is not lower than the crystallization temperature of the polyolefin and not higher than the melting point of the polyolefin, in the event that the polyolefin has a crystallinity of not less than 40%; and the heating temperature in said step is not lower than a temperature obtained by subtracting 15° C. from the melting point of the polyolefin (i.e., heating temperature $\geq$ melting point $-15°$ C.) and not higher than the melting point of the polyolefin, in the event that the polyolefin has a crystallinity of less than 40%.

The ligand-removal step is, for example, a step in which the polyolefin contacted with the ligand decomposer is heated at a temperature of not lower than the melting point of the polyolefin and lower than the decomposition temperature of the polyolefin, with applying a shear force to the polyolefin.

The ligand-removal step is, for example, a step comprising:

(a) a step of melting, by heating, the polyolefin contacted with the ligand decomposer to prepare pellets of the polyolefin, and any one of (b-1) a step of contacting the pellets with hot water, (b-2) a step of contacting the pellets with water vapor and (b-3) a step of maintaining the pellets at a pressure of 0.001 to 0.098 MPa.

The method of treating polyolefin according to the invention includes a step of decomposing ligands having cyclopentadienyl skeleton contained in the polyolefin and a step of removing the decomposed ligands, and therefore polyolefin diminished in odor development in the molding process can be obtained.

DETAILED DESCRIPTION OF THE INVENTION

Figure 1:
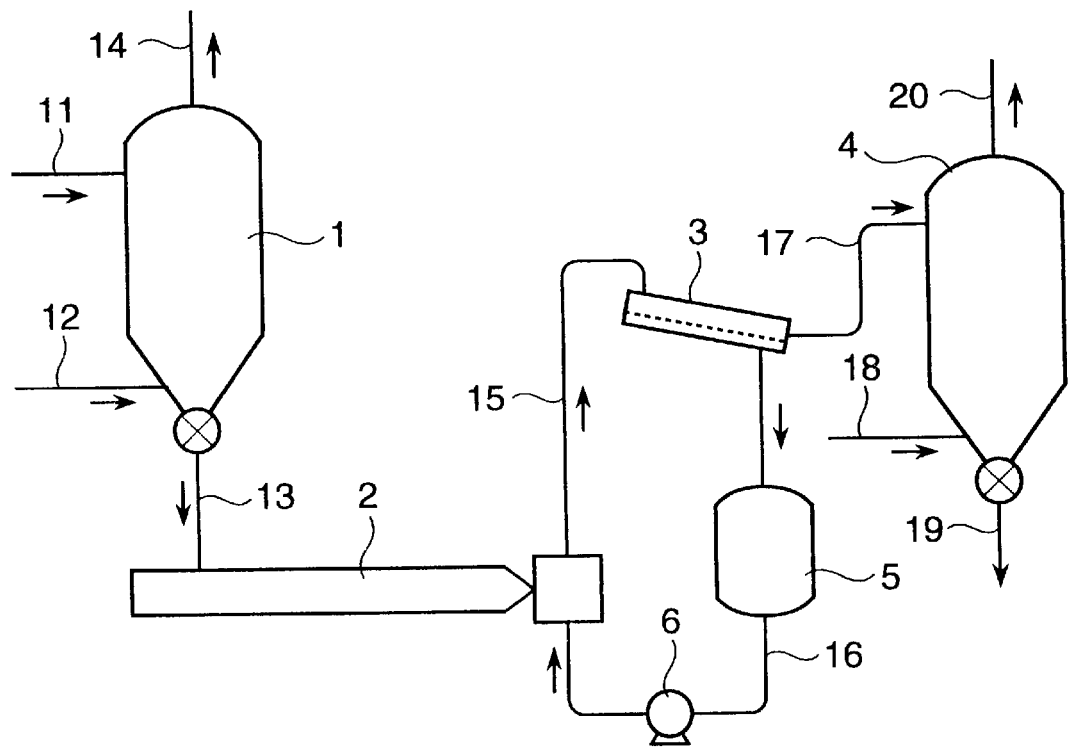
FIG. 1 is a conceptual view showing steps of one embodiment of the method of treating polyolefin according to the present invention.

The method of treating polyolefin according to the invention is described in detail hereinafter.

The method of treating polyolefin according to the invention comprises:

(i) a step of contacting polyolefin, which is obtained by the use of a transition metal compound containing ligands having cyclopentadienyl skeleton, with a ligand decomposer, and (ii) a step of heating the polyolefin contacted with the ligand decomposer.

The polyolefin used in the invention is obtained by the use of a transition metal compound containing ligands having cyclopentadienyl skeleton. Examples of the transition metal compounds containing ligands having cyclopentadienyl skeleton include a transition metal compound containing two ligands having cyclopentadienyl skeleton, which is represented by the following formula (I), and a transition metal compound containing bidentate ligand formed from two ligands having cyclopentadienyl skeleton bonded through a divalent bonding group, which is represented by the following formula (II).

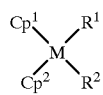

(I)

In the above formula, M is a transition metal atom of Group 4 of the periodic table, i.e., titanium, zirconium or hafnium; $Cp^1$ and $Cp^2$ may be the same or different and are each a ligand having cyclopentadienyl skeleton, which is coordinated to the transition metal atom; and $R^1$ and $R^2$ may be the same or different and are each a hydrocarbon group of 1 to 20 carbon atoms, an alkoxy group, an aryloxy group, a trialkylsilyl group, a halogen atom or a hydrogen atom.

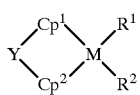

(II)

In the above formula, M, $Cp^1$, $Cp^2$, $R^1$ and $R^2$ are the same as those in the formula (I); and Y is a divalent bonding group such as alkylene or silylene.

In the polyolefin obtained by the use of the transition metal compounds containing ligands having cyclopentadienyl skeleton, some ligands having cyclopentadienyl skeleton remain.

Examples of the ligands (i.e., groups) having cyclopentadienyl skeleton include a (substituted) cyclopentadienyl group, a (substituted) indenyl group, a (substituted) fluorenyl group, and a group wherein two ligands selected from a (substituted) cyclopentadienyl group, a (substituted) indenyl group, a (substituted) fluorenyl group are bonded through a divalent bonding group.

As the substituents of the ligands having cyclopentadienyl skeleton, there can be mentioned (halogenated) hydrocarbon groups of 1 to 20 carbon atoms, oxygen-containing groups, silicon-containing groups and halogen atoms.

Examples of the hydrocarbon groups of 1 to 20 carbon atoms include alkyl groups, cycloalkyl groups, alkenyl groups, arylalkyl groups and aryl groups. More specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryls groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups of 1 to 20 carbon atoms include those wherein the above-exemplified hydrocarbon groups of 1 to 20 carbon atoms are substituted with halogens.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of the hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the halogen atoms include a fluorine atom, a chlorine atom, a bromine atom and an iodine atom.

Examples of the divalent bonding groups represented by Y, which serve to bond two ligands selected from the (substituted) cyclopentadienyl group, the (substituted) indenyl group and the (substituted) fluorenyl group, include a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —B(R)— or —Al(R)— (each R may be the same or different and is a (halogenated) hydrocarbon group of 1 to 20 carbon atoms, a hydrogen atom or a halogen atom).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups of 1 to 20 carbon atoms include those wherein the above-exemplified divalent hydrocarbon groups of 1 to 20 carbon atoms are halogenated, such as chloromethylene.

Examples of the divalent silicon-containing groups include silylene group; alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

Examples of the ligands having cyclopentadienyl skeleton include:

cyclopentadienyl group;

substituted cyclopentadienyl groups, such as methylcyclopentadienyl, dimethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, trimethylcyclopentadienyl, tetramethylcyclopentadienyl, pentamethylcyclopentadienyl, hexylcyclopentadienyl and trimethylsilylcyclopentadienyl;

indenyl group;

substituted indenyl groups, such as 2-methylindenyl, 2-ethylindenyl, 2-methyl-4-phenylindenyl, 2-ethyl-4-phenylindenyl, 2,4,7-trimethylindenyl, 3-methylindenyl, 2,7-dimethyl-4-propylindenyl, 2,7-dimethyl-4-butylindenyl, 2,7-dimethyl-4-pentylindenyl, 2,7-dimethyl-4-hexylindenyl, 2,7-dimethyl-4-cyclohexylindenyl and 4,5,6,7-tetrahydroindenyl;

fluorenyl group; and substituted fluorenyl groups.

In the above examples, the di-substituted cyclopentadienyl rings include 1,2- and 1,3-position substituted cyclopentadienyl rings, and the tri-substituted cyclopentadienyl rings include 1,2,3- and 1,2,4-substituted cyclopentadienyl rings. The alkyl groups such as propyl and butyl include isomers such as n-, i-, sec- and tert-alkyl groups.

Listed below are examples of the groups wherein two ligands selected from the (substituted) cyclopentadienyl group, the (substituted) indenyl group and the (substituted) fluorenyl group are bonded through the divalent bonding group.

Methylene-bis[1-(2-methyl-4-phenylindenyl)],
Methylene-bis[1-(2-ethyl-4-phenylindenyl)],
Methylene-bis[1-(2-ethyl-4-naphthylindenyl)],
Ethylene-bis(indenyl),
Ethylene-bis(4,5,6,7-tetrahydroindenyl),
Ethylene-bis[1-(2-methyl-4-phenylindenyl)],
Ethylene-bis[1-(2-ethyl-4-phenylindenyl)],
Ethylene-bis[1-(2-ethyl-4-naphthylindenyl)],
Ethylene-bis[1-(2-propyl-4-naphthylindenyl)],
Ethylene-bis[1-(2,4,7-trimethylindenyl)],
Isopropylidene-(cyclopentadienyl)(fluorenyl),
Isopropylidene-(cyclopentadienyl)(methylcyclopentadienyl),
Isopropylidene-(methylcyclopentadienyl)(3-methylindenyl),
Isopropylidene-(butylcyclopentadienyl)(3-methylindenyl),
Isopropylidene-(butylcyclopentadienyl)(fluorenyl),
Isopropylidene-bis[1-(2,4,7-trimethylindenyl)],
Dimethylsilylene-bis(cyclopentadienyl),
Dimethylsilylene-bis(methylcyclopentadienyl),
Dimethylsilylene-bis(dimethylcyclopentadienyl),
Dimethylsilylene-bis(trimethylcyclopentadienyl),
Dimethylsilylene-bis(indenyl),
Dimethylsilylene-bis(4,5,6,7-tetrahydroindenyl),
Dimethylsilylene-bis(methylbutylcyclopentadienyl),
Dimethylsilylene-(cyclopentadienyl)(fluorenyl),
Dimethylsilylene-(butylcyclopentadienyl)(fluorenyl),
Dimethylsilylene-(butylcyclopentadienyl)(indenyl),
Diphenylsilylene-bis(indenyl),
Dimethylsilylene-(methylcyclopentadienyl)(3-methylindenyl),
Dimethylsilylene-(butylcyclopentadienyl)(3-methylindenyl),
Dimethylsilylene-bis[1-(2-methyl-4-phenylindenyl)],
Dimethylsilylene-bis[1-(2-methyl-4-naphthylindenyl)],
Dimethylsilylene-bis[1-(2-methyl-4-anthrylindenyl)],
Dimethylsilylene-bis[1-(2-methyl-4-phenanthrylindenyl)],
Dimethylsilylene-bis[1-(2-methyl-4-(fluorophenyl)indenyl)],
Dimethylsilylene-bis[1-(2-methyl-4-(pentafluorophenyl)indenyl)],
Dimethylsilylene-bis[1-(2-methyl-4-(chlorophenyl)indenyl)],
Dimethylsilylene-bis[1-(2-methyl-4-(dichlorophenyl)indenyl)],
Dimethylsilylene-bis[1-(2-methyl-4-(bromophenyl)indenyl)],
Dimethylsilylene-bis[1-(2-methyl-4-(tolyl)indenyl)],
Dimethylsilylene-bis[1-(2-methyl-4-(dimethylphenyl)indenyl)],
Dimethylsilylene-bis[1-(2-methyl-4-(ethylphenyl)indenyl)],
Dimethylsilylene-bis[1-(2-methyl-4-(propylphenyl)indenyl)],
Dimethylsilylene-bis[1-(2-methyl-4-(benzylphenyl)indenyl)],
Dimethylsilylene-bis[1-(2-methyl-4-biphenylylindenyl)],
Dimethylsilylene-bis[1-(2-methyl-4-(trimethylsilylphenyl)indenyl)],
Dimethylsilylene-bis[1-(2-phenyl-4-phenylindenyl)],
Dimethylsilylene-bis[1-(2-ethyl-4-phenylindenyl)],
Dimethylsilylene-bis[1-(2-ethyl-4-naphthylindenyl)],
Dimethylsilylene-bis[1-(2-ethyl-4-(2-methyl-1-naphthyl)indenyl)],
Dimethylsilylene-bis[1-(2-ethyl-4-acenaphthylindenyl)],
Dimethylsilylene-bis[1-(2-ethyl-4-anthrylindenyl)],
Dimethylsilylene-bis[1-(2-ethyl-4-phenanthrylindenyl)],
Dimethylsilylene-bis[1-(2-ethyl-4-(methylphenyl)indenyl)],
Dimethylsilylene-bis[1-(2-ethyl-4-(dimethylphenyl)indenyl)],
Dimethylsilylene-bis[1-(2-ethyl-4-(trimethylphenyl)indenyl)],
Dimethylsilylene-bis[1-(2-ethyl-4-(chlorophenyl)indenyl)],
Dimethylsilylene-bis[1-(2-ethyl-4-(dichlorophenyl)indenyl)],
Dimethylsilylene-bis[1-(2-ethyl-4-(bromophenyl)indenyl)],
Dimethylsilylene-bis[1-(2-ethyl-4-biphenylylindenyl)], Dimethylsilylene-bis[1-(2-ethyl-4-(trimethylsilylphenyl)indenyl)],
Dimethylsilylene-bis[1-(2-propyl-4-phenylindenyl)],
Dimethylsilylene-bis[1-(2-propyl-4-naphthylindenyl)],
Dimethylsilylene-bis[1-(2-propyl-4-(methylnaphthyl)indenyl)],
Dimethylsilylene-bis[1-(2-propyl-4-acenaphthylindenyl)],
Dimethylsilylene-bis[1-(2-propyl-4-anthrylindenyl)],
Dimethylsilylene-bis[1-(2-propyl-4-phenanthrylindenyl)],
Dimethylsilylene-bis[1-(2-butyl-4-phenylindenyl)],
Dimethylsilylene-bis[1-(2-butyl-4-naphthylindenyl)],
Dimethylsilylene-bis[1-(2-butyl-4-(methylnaphthyl)indenyl)],
Dimethylsilylene-bis[1-(2-butyl-4-acenaphthylindenyl)],
Dimethylsilylene-bis[1-(2-butyl-4-anthrylindenyl)],
Dimethylsilylene-bis[1-(2-butyl-4-phenanthrylindenyl)],
Dimethylsilylene-bis[1-(2-pentyl-4-phenylindenyl)],
Dimethylsilylene-bis[1-(2-pentyl-4-naphthylindenyl)],
Dimethylsilylene-bis[1-(2-neopentyl-4-phenylindenyl)],
Dimethylsilylene-bis[1-(2-neopentyl-4-naphthylindenyl)],
Dimethylsilylene-bis[1-(2-hexyl-4-phenylindenyl)],
Dimethylsilylene-bis[1-(2-hexyl-4-naphthylindenyl)],
Dimethylsilylene-bis[1-(2,7-dimethyl-4-ethylindenyl)],
Dimethylsilylene-bis[1-(2,7-dimethyl-4-propylindenyl)],
Dimethylsilylene-bis[1-(2,7-dimethyl-4-butylindenyl)],
Dimethylsilylene-bis[1-(2,7-dimethyl-4-pentylindenyl)],
Dimethylsilylene-bis[1-(2,7-dimethyl-4-hexylindenyl)],
Dimethylsilylene-bis[1-(2,7-dimethyl-4-cyclohexylindenyl)],
Dimethylsilylene-bis[1-(2,7-dimethyl-4-(methylcyclohexyl)indenyl)],
Dimethylsilylene-bis[1-(2,7-dimethyl-4-(phenylethyl)indenyl)],
Dimethylsilylene-bis[1-(2,7-dimethyl-4-(phenyldichloromethyl)indenyl)],
Dimethylsilylene-bis[1-(2,7-dimethyl-4-(chloromethyl)indenyl)],
Dimethylsilylene-bis[1-(2,7-dimethyl-4-(trimethylsilylmethyl)indenyl)],
Dimethylsilylene-bis[1-(2,7-dimethyl-4-(trimethylsiloxymethyl)indenyl)],
Dimethylsilylene-bis[1-(2-methyl-4-propyl-7-ethylindenyl)],
Dimethylsilylene-bis[1-(2,3,7-trimethyl-4-ethylindenyl)],
Dimethylsilylene-bis[1-(2,3,7-trimethyl-4-propylindenyl)],
Dimethylsilylene-bis[1-(2,3,7-trimethyl-4-butylindenyl)],
Dimethylsilylene-bis[1-(2,3,7-trimethyl-4-pentylindenyl)],
Dimethylsilylene-bis[1-(2,3,7-trimethyl-4-hexylindenyl)],
Dimethylsilylene-bis[1-(2,3,7-trimethyl-4-cyclohexylindenyl)],
Dimethylsilylene-bis[1-(2,3,7-trimethyl-4-(methylcyclohexyl)indenyl)],
Dimethylsilylene-bis[1-(2,3,7-trimethyl-4-(trimethylsilyl)indenyl)],
Dimethylsilylene-bis[1-(2,3,7-trimethyl-4-(trimethylsiloxymethyl)indenyl)],
Dimethylsilylene-bis[1-(2,3,7-trimethyl-4-(phenylethyl)indenyl)],
Dimethylsilylene-bis[1-(2,3,7-trimethyl-4-(phenyldichloromethyl)indenyl)],
Dimethylsilylene-bis[1-(2,3,7-trimethyl-4-(chloromethyl)indenyl)],
Dimethylsilylene-bis[1-(2,7-dimethyl-4-propylindenyl)],
Dimethylsilylene-bis[1-(2,3,7-trimethyl-4-propylindenyl)],
Dimethylsilylene-bis[1-(2-methyl-4,6-dipropylindenyl)],
Dimethylsilylene-bis[1-(2-ethyl-4-propyl-7-methylindenyl)],
Dimethylsilylene-bis[1-(2-phenyl-4-propyl-7-methylindenyl)],
Dimethylsilylene-bis[1-(2-methylindenyl)],
Diethylsilylene-bis[1-(2,7-dimethyl-4-propylindenyl)],
Diethylsilylene-bis[1-(2-methyl-4-phenylindenyl)],
Diethylsilylene-bis[1-(2,3,7-trimethyl-4-propylindenyl)],
Methylphenylsilylene-bis(indenyl),
Methylphenylsilylene-bis[1-(2-methyl-4-phenylindenyl)],
Methylphenylsilylene-bis[1-(2-ethyl-4-phenylindenyl)],
Methylphenylsilylene-bis[1-(2-ethyl-4-naphthylindenyl)],
Methylphenylsilylene-bis[1-(2-ethyl-4-anthrylindenyl)],
Methylphenylsilylene-bis[1-(2-ethyl-4-phenanthrylindenyl)],
Methylphenylsilylene-bis[1-(2,7-dimethyl-4-propylindenyl)],
Methylphenylsilylene-bis[1-(2,7-dimethyl-4-butylindenyl)],
Methylphenylsilylene-bis[1-(2,3,7-trimethyl-4-propylindenyl)],
Methylphenylsilylene-bis[1-(2,3,7-trimethyl-4-butylindenyl)],
Dipropylsilylene-bis[1-(2-methyl-4-phenylindenyl)],
Dipropylsilylene-bis[1-(2,7-dimethyl-4-propylindenyl)],
Dipropylsilylene-bis[1-(2,3,7-trimethyl-4-propylindenyl)],
Dibutylsilylene-bis[1-(2-methyl-4-phenylindenyl)],
Dibutylsilylene-bis[1-(2,7-dimethyl-4-propylindenyl)],
Dibutylsilylene-bis[1-(2,3,7-trimethyl-4-propylindenyl)],
Dicyclohexylsilylene-bis[1-(2-methyl-4-phenylindenyl)],
Dicyclohexylsilylene-bis[1-(2,7-dimethyl-4-propylindenyl)],
Dicyclohexylsilylene-bis[1-(2,3,7-trimethyl-4-propylindenyl)],
Diphenylsilylene-bis[1-(2-methyl-4-phenylindenyl)],
Diphenylsilylene-bis[1-(2-ethyl-4-phenylindenyl)],
Diphenylsilylene-bis[1-(2-ethyl-4-naphthylindenyl)],
Diphenylsilylene-bis[1-(2-ethyl-4-anthrylindenyl)],
Diphenylsilylene-bis[1-(2-ethyl-4-phenanthrylindenyl)],
Diphenylsilylene-bis[1-(2-ethyl-4-biphenylylindenyl)],
Diphenylsilylene-bis[1-(2,7-dimethyl-4-butylindenyl)],
Diphenylsilylene-bis[1-(2,7-dimethyl-4-propylindenyl)],
Diphenylsilylene-bis[1-(2,7-dimethyl-4-ethylindenyl)],
Diphenylsilylene-bis[1-(2,3,7-trimethyl-4-butylindenyl)], Diphenylsilylene-bis[1-(2,3,7-trimethyl-4-propylindenyl)],
Diphenylsilylene-bis[1-(2,3,7-trimethyl-4-ethylindenyl)],
Ditolylsilylene-bis[1-(2-methyl-4-phenylindenyl)],
Ditolylsilylene-bis[1-(2,7-dimethyl-4-propylindenyl)],
Ditolylsilylene-bis[1-(2,3,7-trimethyl-4-propylindenyl)],
Di(chlorophenyl)silylene-bis[1-(2-methyl-4-phenylindenyl)],
Di(chlorophenyl)silylene-bis[1-(2,7-dimethyl-4-propylindenyl)],
Di(chlorophenyl)silylene-bis[1-(2,3,7-trimethyl-4-propylindenyl)],
Dimethylgermylene-bis[1-(2-methyl-4-phenylindenyl)],
Dimethylgermyl-bis[1-(2-ethyl-4-phenylindenyl)],
Dimethylgermyl-bis[1-(2-ethyl-4-naphthylindenyl)],
Dimethylgermyl-bis[1-(2-propyl-4-phenylindenyl)], and
Dimethylstannylene-bis[1-(2-methyl-4-phenylindenyl)].

In the above examples, the di-substituted cyclopentadienyl rings include 1,2- and 1,3-position substituted cyclopentadienyl rings, and the tri-substituted cyclopentadienyl rings include 1,2,3- and 1,2,4-substituted cyclopentadienyl rings. The alkyl groups such as propyl and butyl include isomers such as n-, i-, sec- and tert-alkyl groups.

The polyolefins used in the present invention are obtained by the use of the transition metal compound containing the ligands having the aforementioned cyclopentadienyl skeleton, and the ligands having the cyclopentadienyl skeleton remain therein. In the present invention, the polyolefin is subjected to contact with a ligand decomposer to decompose the ligands contained in the polyolefin (a ligand-decompostion step), and the polyolefin contacted with the ligand decomposer is subjected to heating to remove the decomposed ligands from the polyolefin.

Examples of the ligand decomposers employable in the ligand-decomposition step include water, oxygen, alcohols, alkylene oxides and peroxides. More specifically, there can be mentioned:

alcohols having 10 or less carbon atoms, e.g., monoalcohols, such as methanol, ethanol, propanol, isopropanol, butanol, pentanol, hexanol, heptanol, octanol, cyclopentanol and cyclohexanol, and dialcohols, such as ethylene glycol;

alkylene oxides, such as ethylene oxide, propylene oxide, trimethylene oxide, tetrahydrofuran and tetrahydropyran; and peroxides, such as propylene peroxide and butene peroxide.

Of these, preferable are water and alcohols having 5 or less carbon atoms, and particularly preferable is water.

In order to contact the polyolefin with the ligand decomposer, the polyolefin is contacted with, for example, a gaseous stream containing the ligand decomposer. In this event, a powder of the polyolefin is passed through a container with introducing a gas containing the ligand decomposer into the container.

The mean particle diameter of the polyolefin powder to be contacted with the ligand decomposer is in the range of usually 50 to 5,000 µm, preferably 80 to 3,000 µm, more preferably 100 to 2,000 µm.

Examples of the gases to incorporate therein the ligand decomposer include inert gases such as a nitrogen gas and an argon gas.

In the gas, the ligand decomposer is contained usually in the form of vapor. The amount of the ligand decomposer contained in the ligand decomposer-containing gas is in the range of usually 0.1 to 40% by weight, preferably 0.5 to 20% by weight, particularly preferably 1 to 10% by weight.

The superficial velocity of the ligand decomposer-containing gas in a column is in the range of usually 0.01 to 20 cm/sec, preferably 0.1 to 10 cm/sec, particularly preferably 0.5 to 5 cm/sec. The superficial velocity in a column is calculated from the temperature and the pressure of the ligand decomposer-containing gas at the gas exhaust vent of an apparatus used for contacting the polyolefin with the ligand decomposer and from the sectional area of the apparatus.

When the polyolefin has a crystallinity of not less than 40%, the temperature in the contact of the polyolefin with the ligand decomposer is not lower than the crystallization temperature of the polyolefin and lower than the decomposition temperature of the polyolefin, specifically 100 to 300° C., preferably 100 to 280° C. When the polyolefin has a crystallinity of less than 40%, the temperature in the contact of the polyolefin with the ligand decomposer is not lower than a temperature obtained by subtracting 15° C. from the melting point of the polyolefin and lower than the decomposition temperature of the polyolefin, specifically 85 to 300° C., preferably 90 to 280° C.

The crystallinity (Xc) of polyolefin is measured in the following manner. Polyolefin is preheated at 190° C. for 7 minutes, and thereto is applied a pressure of 100 kg/cm$^2$ for 2 minutes. Then, the polyolefin is cooled at 20° C. under a pressure of 100 kg/cm$^2$ to prepare a pressed sheet having a thickness of 5 mm. The pressed sheet is cut to give a specimen (sample) of about 5 mg, and the sample is introduced into an aluminum pan. The sample is heated from room temperature to 150° C. at a heating rate of 10° C./min to measure endotherm of the sample using DSC-II of Perkin Elmer Co., whereby an endotherm curve of the sample is obtained. The endotherm curve of the sample is then converted to the quantity of heat of melting using an area of an endotherm curve of indium separately weighed. On the endotherm curve of the sample, the point at the position of 35° C. and the point at which no endothermic peak comes to appear are connected with each other to give a base line. The quantity of heat of melting (A (J/g)) obtained by the measurement is divided by the quantity of heat of melting of 100% polyethylene crystals (260 (J/g)), to obtain a crystallinity (Xc=A/260).

The pressure is in the range of usually 0.0001 to 0.6 MPa, preferably 0.001 to 0.35 MPa, particularly preferably 0.01 to 0.25 MPa.

The contact time (residence time) is in the range of usually 1 minute to 3 hours, preferably 2 minutes to 2 hours, particularly preferably 5 minutes to 1 hour.

By virtue of the contact of the polyolefin with the ligand decomposer, the ligands can be decomposed, and therefore the legands having a high-boiling point can be converted to a low-boiling point compound. Further, some kinds of the ligands can be made odorless by the decomposition.

In the present invention, the polyolefin is contacted with the ligand decomposer as described above, and then the polyolefin is heated to remove the decomposed ligands from the polyolefin.

In order to remove the ligands by heating the polyolefin contacted with the ligand decomposer, the following methods are employable.

(1) The polyolefin is heated in a stream of an inert gas using a dryer such as a rotary dryer, a belt dryer, a flash dryer, a spray dryer or a paddle dryer.

(2) The polyolefin is melted by heating using a single-screw or twin-screw extruder.

If the method (2) is adopted, it is possible that the molten polyolefin is pelletized and the resulting pellets are subjected to any of the following steps (b-1) to (b-3).

(b-1) The pellets are contacted with hot water.

(b-2) The pellets are contacted with water vapor (steam).

(b-3) The pellets are heated under a pressure of 0.001 to 0.98 MPa.

In the method (1), when the polyolefin has a crystallinity of not less than 40%, the temperature for heating the polyolefin is not lower than the crystallization temperature of the polyolefin and lower than the decomposition temperature of the polyolefin, or not lower than the crystallization temperature of the polyolefin and not higher than the melting point of the polyolefin, specifically 100 to 300° C., preferably 100 to 280° C.

When the polyolefin has a crystallinity of less than 40%, the temperature for heating the polyolefin is not lower than a temperature obtained by subtracting 15° C. from the melting point of the polyolefin and lower than the decomposition temperature of the polyolefin, or not lower than a temperature obtained by subtracting 15° C. from the melting point of the polyolefin and not higher than the melting point of the polyolefin, specifically 85 to 300° C., preferably 90 to 280° C.

The pressure is in the range of usually 0.0001 to 0.6 MPa, preferably 0.001 to 0.35 MPa, particularly preferably 0.01 to 0.25 MPa.

The heating time (residence time) is in the range of usually 1 minute to 3 hours, preferably 2 minutes to 2 hours, particularly preferably 5 minutes to 1 hour.

Examples of the inert gases employable herein include a nitrogen gas, a helium gas and an argon gas.

The flow velocity of the gas in the dryer is in the range of usually 0.01 to 20 cm/sec, preferably 0.1 to 10 cm/sec, particularly preferably 0.1 to 5 cm/sec.

In the method (2), the temperature for heating the polyolefin is the same as that in the method (1).

In the present invention, if the polyolefin is heated at a temperature of not lower than the melting point of the polyolefin and lower than the decomposition temperature of the polyolefin, the heating is preferably carried out with applying a shear force to the polyolefin. In order to apply a shear force to the polyolefin, a paddle dryer, a single-screw extruder, a twin-screw extruder, etc. are employed.

When the method (2) is used in the invention, it is possible that the molten polyolefin is pelletized and the resulting pellets are subjected to any of the above steps (b-1) to (b-3).

Examples of the apparatuses employable for conducting the step (b-1) include a countercurrent extraction column, a tank equipped with a stirring device and a multi-stage horizontal extraction bath. Examples of the apparatuses employable for conducting the steps (b-2) and (b-3) include a silo and a hopper.

In the step (b-1), the temperature of hot water is in the range of usually 35 to 200° C., preferably 40 to 180° C., particularly preferably 45 to 150° C.; and the contact time is in the range of 1 to 900 minutes, preferably 5 to 600 minutes, particularly preferably 10 to 360 minutes.

In the step (b-2), the polyolefin is contacted with a gas containing water vapor (steam) in the same manner as in the ligand-decomposition step described above. Examples of the gases to incorporate water vapor therein include the aforesaid inert gases and air.

When the polyolefin has a crystallinity of not less than 40%, the temperature in the contact of the polyolefin with the water vapor-containing gas is not lower than the crystallization temperature of the polyolefin and lower than the decomposition temperature of the polyolefin, or not lower than the crystallization temperature of the polyolefin and not higher than the melting point of the polyolefin, specifically 100 to 300° C., preferably 100 to 280° C.

When the polyolefin has a crystallinity of less than 40%, the temperature in the contact of the polyolefin with the water vapor-containing gas is not lower than a temperature obtained by subtracting 15° C. from the melting point of the polyolefin and lower than the decomposition temperature of the polyolefin, or not lower than a temperature obtained by subtracting 15° C. from the melting point of the polyolefin and not higher than the melting point of the polyolefin, specifically 85 to 300° C., preferably 90 to 280° C.

The pressure is in the range of usually 0.0001 to 0.6 MPa, preferably 0.001 to 0.35 MPa, particularly preferably 0.01 to 0.25 MPa.

The amount of the water vapor contained in the water vapor-containing gas is in the range of usually 0.1 to 40% by weight, preferably 0.5 to 20% by weight, particularly preferably 1 to 10% by weight.

The superficial velocity of the water vapor-containing gas in a column is in the range of usually 0.01 to 20 cm/sec, preferably 0.1 to 10 cm/sec, particularly preferably 0.5 to 5 cm/sec.

The contact time (residence time) is in the range of usually 0.5 to 30 hours, preferably 1 to 24 hours, particularly preferably 2 to 20 hours.

In the method (b-3), the pressure is in the range of 0.001 to 0.100 MPa, preferably 0.007 to 0.098 MPa, particularly preferably 0.01 to 0.07 MPa; and the temperature is in the range of 35 to 200° C., preferably 40 to 180° C., particularly preferably 45 to 150° C. The heating time is 0.5 to 30 hours, preferably 1 to 24 hours, particularly preferably 2 to 20 hours.

In each of the steps (b-1) to (b-3), the mean particle diameter of the polyolefin pellets is in the range of usually 1 to 30 mm, preferably 3 to 20 mm, more preferably 5 to 15 mm.

Figure 2:
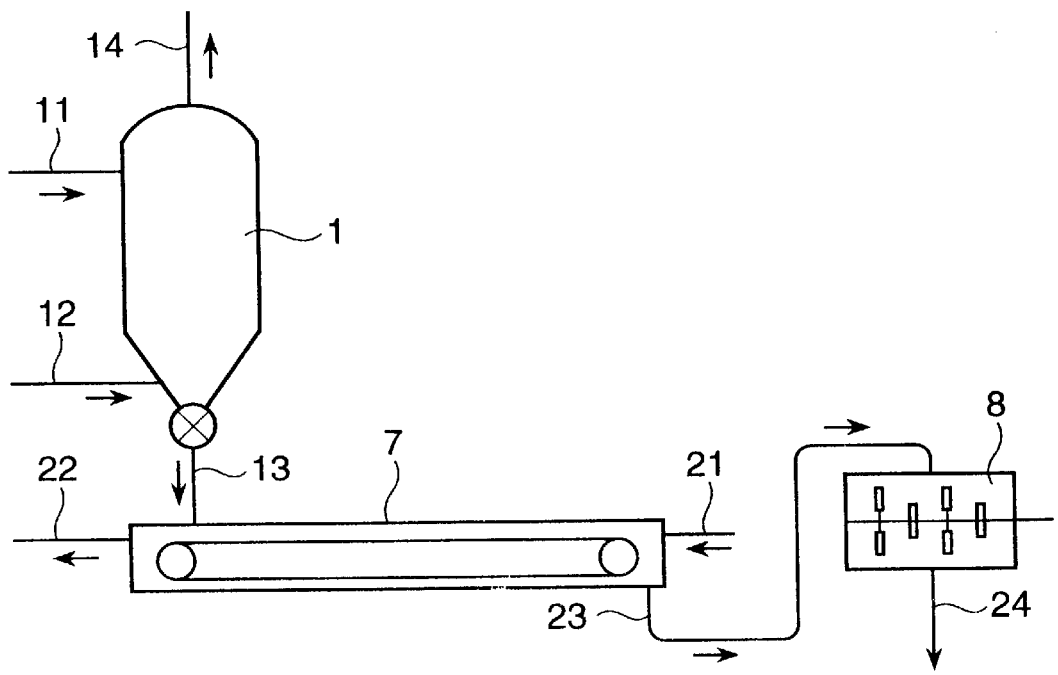
FIG. 2 is a conceptual view showing steps of another embodiment of the method of treating polyolefin according to the present invention.

More specifically, the method of treating polyolefin according to the invention can be carried out through, for example, the steps shown in FIG. 1 or FIG. 2.

FIG. 1 is a conceptual view showing steps of one embodiment of the method of treating polyolefin according to the invention, and FIG. 2 is a conceptual view showing steps of another embodiment of the method of treating polyolefin according to the present invention. Referring to these figures, the ligand-decomposition step is carried out in a silo designated by numeral 1, and the ligand-removal step is carried out in an extruder designated by numeral 2, a silo designated by numeral 4 or a dryer designated by numeral 7.

Hereinafter, the embodiment wherein water (steam) is used as the ligand-decomposer is explained.

Referring to FIG. 1, a powder of polyolefin is continuously fed to the silo 1 through a powder feed pipe 11. To the silo 1, an inert gas containing water vapor is also fed through a gas feed pipe 12 provided at the lower part of the silo 1. Thus, the polyolefin powder is contacted with the ligand decomposer to decompose ligands contained in the polyolefin. The inert gas containing water vapor, which has been fed to the silo 1, is exhausted out of the silo 1 from a gas exhaust pipe 14.

The polyolefin powder contacted with the water vapor is discharged out of the silo 1 from a powder discharge pipe 13 and then fed to an extruder 2. In the extruder 2, the polyolefin is melted by heating, and cooled with water to be pelletized, whereby a part of the decomposed ligands are removed from the polyolefin. The resulting polyolefin pellets are passed through a line 15 together with water and fed to a water separator 3. The polyolefin pellets are separated from water in the separator 3 and then fed to a silo 4 through a pellet feed pipe 17. The water separated from the polyolefin pellets in the separator 3 is passed through a circulating line 16 and is used again as cooling water. In FIG. 1, numeral 5 designates a water tank, and numeral 6 designates a pump.

To the silo 4, an inert gas containing water vapor is also fed through a gas feed pipe 18 provided at the lower part of the silo 4. Thus, the polyolefin pellets are contacted with water vapor to further remove the decomposed ligands from the polyolefin. The water vapor-containing inert gas, which has been fed to the silo 4, is exhausted out of the silo 4 from a gas exhaust pipe 20. The pellets of polyolefin from which the decomposed ligands have been removed are discharged from a pellet discharge pipe 19.

Referring to FIG. 2, a powder of polyolefin is contacted with an inert gas containing vapor of a ligand decomposer in a silo 2 to decompose ligands contained in the polyolefin, in the same manner as described in FIG. 1. The polyolefin powder contacted with the water vapor is then discharged out of the silo 1 from a powder discharge pipe 13 and fed to a dryer 7. In FIG. 2, a belt dryer is shown as the dryer 7, but the dryer 7 is not limited to the belt dryer.

To the dryer 7, a heated inert gas is also fed through a gas feed pipe 21. Thus, the polyolefin powder is contacted with the inert gas and heated, whereby the decomposed ligands are removed from the polyolefin. The inert gas, which has been fed to the dryer 7, is exhausted from a gas exhaust pipe 22.

The powder of polyolefin from which the decomposed ligands are removed is fed to a granulator 8 through a line 23, granulated therein and then discharged from a discharge pipe 24.

EFFECT OF THE INVENTION

According to the method of the present invention, residual ligands having cyclopentadienyl skeleton, which are contained in polyolefin produced by the use of a transition metal compound containing ligands having cyclopentadienyl skeleton, are decomposed and removed from the polyolefin, whereby polyolefin diminished in odor development in the molding process can be obtained.

EXAMPLE

The present invention will be further described with reference to the following examples, but it should be construed that the invention is in no way limited to those examples.

In the examples, measurement of the quantity of residual ligands and evaluation of odor development were made in the following manner.

Quantity of Residual Ligands

The residual ligands were extracted with toluene. The extract was identified and quantitatively determined in accordance with a calibration curve method using a gas chromatograph mass spectrometer.

Odor Development

Polyolefin pellets of 400 g were introduced into a 1-liter wide-mouthed bottle. The bottle was closed with a lid and thoroughly shaken for 30 seconds. Then, the lid was taken off and the odor development was evaluated.

That is, odor development of the polyolefin was evaluated based on the following five criteria. When the polyolefin is graded as 5 or 4, it is considered to be no matter in the practical use.

5: No odor is developed.
4: Slight odor is developed.
3: A little odor is developed.
2: Considerable odor is developed.
1: Serious odor is developed.

Example 1

Polyethylene obtained by the use of a metallocene compound having 1-methyl-3-butylcyclopentadienyl as ligand and having a crystallinity of 50%, a crystallization temperature of 101° C., a melting point of 117° C., MI of 4.0 g/10 min, a density of 0.920 g/cm$^3$, a particle diameter of 1,100 $\mu$m and a bulk density of 0.420 g/cm$^3$ was treated in the following manner through the steps shown in FIG. 1. Before the treatment, the quantity of the residual ligands in the polyethylene was 500 ppb and the grade of the odor development was 1.

Ligand-decomposer Contacting Step & Liganddecomposition Step

A water vapor-containing nitrogen gas was introduced into a silo, and the silo was set at a temperature of 80° C. under a pressure of 0.05 kg/cm$^2$-G. Then, a powder of the polyolefin (polyethylene) was passed through the silo for a residence time of 3 minutes.

The weight ratio of water to the polyethylene powder (PE), water/PE, was 0.002, and the ratio of the nitrogen gas (N$_2$) to the polyethylene powder (PE), N$_2$(N-m$^3$)/PE, was 0.004.

First Ligand-removal Step

The polyethylene powder subjected to the liganddecomposition step was then pelletized using a twin-screw extruder at an outlet temperature of 180° C.

Second Ligand-removal Step

A water vapor-containing air was introduced into a silo, and the silo was set at a temperature of 90° C. under a pressure of 1.7 kg/cm$^2$-G. Then, the pellets of the polyolefin (polyethylene) were passed through the silo for a residence time of 12 hours.

The weight ratio of water vapor (water) to the polyethylene pellets (PE), water/PE, was 0.018, and the ratio of air to the polyethylene pellets (PE), air(N-m$^3$)/PE(kg), was 0.016.

The polyethylene treated as above was measured on the quantity of residual ligands and evaluated on the odor development. The results are set forth in Table 1.

Example 2

Treatment of polyethylene was carried out in the same manner as in Example 1, except that the second ligandremoval step was not effected. The thus treated polyethylene was measured on the quantity of residual ligands and evaluated on the odor development. The results are set forth in Table 1.

Comparative Example 1

Treatment of polyethylene was carried out in the same manner as in Example 1, except that the liganddecomposition step was not effected. The thus treated polyethylene was measured on the quantity of residual ligands and evaluated on the odor development. The results are set forth in Table 1.

Examples 3–7

Treatment of polyethylene was carried out in the same manner as in Example 1, except that the polyethylene of Example 1 was replaced with that shown in Table 1. The thus treated polyethylene was measured on the quantity of residual ligands and evaluated on the odor development. The results are set forth in Table 1.

Example 8

The same polyethylene as used in Example 1 was treated in the following manner through the steps shown in FIG. 2.

Ligand-decomposition Step

A nitrogen gas containing methanol vapor was introduced into a silo, and the silo was set at a temperature of 80° C. under a pressure of 0.05 kg/cm$^2$-G. Then, a powder of the polyolefin (polyethylene) was passed through the silo for a residence time of 3 minutes.

The weight ratio of methanol to the polyethylene powder (PE), methanol/PE, was 0.0002, and the ratio of the nitrogen gas ($N_2$) to the polyethylene powder (PE), $N_2$(N-m$^3$)/PE (kg), was 0.004.

The above-described ligand-decomposition step was the same as the ligand-decomposition step of Example 1, except that the methanol vapor-containing nitrogen gas was used in place of the water vapor-containing nitrogen gas.

Ligand-removal Step

Through a belt dryer set at a temperature of 120° C., the polyethylene powder was passed for a residence time of 1 minute.

The polyethylene treated as above was measured on the quantity of residual ligands and evaluated on the odor development. The results are set forth in Table 1.

TABLE 1

| Process<br>Ligand | Ex. 1<br>FIG. 1 | Ex. 2<br>FIG. 1 | Comp. Ex. 1<br>FIG. 1 | Ex. 3<br>FIG. 1 | Ex. 4<br>FIG. 1 |
|---|---|---|---|---|---|
| Polyolefin | | | | | |
| Powder crystallinity (%) | 50 | 50 | 50 | 55 | 53 |
| Crystallization temperature (° C.) | 101 | 101 | 101 | 101 | 101 |
| Melting point (° C.) | 117 | 117 | 117 | 115 | 120 |
| MI (g/10 min) | 4.0 | 4.0 | 4.0 | 4.0 | 4.0 |
| Density (g/cm$^3$) | 0.920 | 0.920 | 0.920 | 0.921 | 0.921 |
| Particle diameter (μm) | 1100 | 1100 | 1100 | 1000 | 900 |
| Bulk density (g/cm$^3$) | 0.420 | 0.420 | 0.420 | 0.435 | 0.440 |
| Decomposition step | | | | | |
| Decomposer | water | water | | water | water |
| Residence time (min) | 3 | 3 | | 3 | 3 |
| Pressure (kg/cm$^2$-G) | 0.05 | 0.05 | | 0.05 | 0.05 |
| Temperature (° C.) | 80 | 80 | | 80 | 80 |
| Decomposer/Powder (wt/wt) | 0.002 | 0.002 | | 0.002 | 0.002 |
| $N_2$/Powder (N-m$^3$/kg) | 0.004 | 0.004 | | 0.004 | 0.004 |
| Removal step | | | | | |
| Heat treatment temperature (° C.) | 180 | 180 | 180 | 180 | 180 |
| Residence time (hr) | 12 | | 12 | 12 | 12 |
| Temperature of steam (° C.) | 90 | | 90 | 90 | 90 |
| Steam/pellet (wt/wt) | 0.018 | | 0.018 | 0.018 | 0.018 |
| Air/pellet (N-m$^3$/wt) | 0.016 | | 0.016 | 0.016 | 0.016 |
| Result Quantity of residual ligand | not more than 1 ppb | not more than 1 ppb | 10 ppb | not more than 1 ppb | not more than 1 ppb |
| Odor development | 5 | 4 | 1 | 5 | 5 |

| Process<br>Ligand | Ex. 5<br>FIG. 1 | Ex. 6<br>FIG. 1 | Ex. 7<br>FIG. 1 | Ex. 8<br>FIG. 2 |
|---|---|---|---|---|
| Polyolefin | | | | |
| Powder crystallinity (%) | 55 | 55 | 35 | 50 |
| Crystallization temperature (° C.) | 101 | 101 | 100 | 101 |
| Melting point (° C.) | 120 | 121 | 114 | 117 |

TABLE 1-continued

|  |  |  |  |  |
|---|---|---|---|---|
| MI (g/10 min) | 3.5 | 3.6 | 3.9 | 4.0 |
| Density (g/cm³) | 0.922 | 0.922 | 0.904 | 0.920 |
| Particle diameter (μm) | 900 | 900 | 1200 | 1100 |
| Bulk density (g/cm³) | 0.445 | 0.410 | 0.380 | 0.420 |
| Decomposition step |  |  |  |  |
| Decomposer | water | water | water | methyl alcohol |
| Residence time (min) | 3 | 3 | 3 | 3 |
| Pressure (kg/cm²-G) | 0.05 | 0.05 | 0.05 | 0.05 |
| Temperature (° C.) | 80 | 80 | 70 | 80 |
| Decomposer/Powder (wt/wt) | 0.002 | 0.002 | 0.002 | 0.0002 |
| N₂/Powder (N-m³/kg) | 0.004 | 0.004 | 0.004 | 0.004 |
| Removal step |  |  |  |  |
| Heat treatment temperature (° C.) | 180 | 180 | 180 | hot-air drying condition |
| Residence time (hr) | 12 | 12 | 18 | 1 min |
| Temperature of steam (° C.) | 90 | 90 | 70 |  |
| Steam/pellet (wt/wt) | 0.018 | 0.018 | 0.018 | temperature |
| Air/pellet (N-m³/wt) | 0.016 | 0.016 | 0.016 | 120° C. |
| Result Quantity of residual ligand | not more than 1 ppb | not more than 1 ppb | not more than 1 ppb | not more than 1 ppb |
| Odor development | 5 | 4 | 4 | 4 |

What is claimed is:

1. A method of treating polyolefin, comprising:
   (i) a step of contacting polyolefin, which is obtained by the use of a metallocene compound, with a gaseous stream containing a ligand decomposer, said polyolefin being in the form of a powder, and
   (ii) a step of heating the polyolefin contacted with the ligand decomposer.

2. A method of treating polyolefin, comprising:
   (i) a ligand-decomposition step of contacting polyolefin, which is obtained by the use of a transition metal compound containing ligands having cyclopentadienyl skeleton, with a gaseous stream containing a ligand decomposer to decompose the ligands contained in the polyolefin, said polyolefin being in the form of a powder, and
   (ii) a ligand-removal step of heating the polyolefin contacted with the ligand decomposer to remove the decomposed ligands from the polyolefin.

3. The method of treating polyolefin as claimed in claim 2, wherein the ligand decomposer is at least one compound selected from the group consisting of water, oxygen, alcohol, alkylene oxide and peroxide.

4. The method of treating polyolefin in claim 2, wherein the mean particle diameter of the polyolefin in the ligand-decomposition step is in the range of 50 to 5,000 μm.

5. The method of treating polyolefin as claimed in claim 2, wherein the heating temperature in the ligand-removal step is:
   not lower than the crystallization temperature of the polyolefin and lower than the decomposition temperature of the polyolefin in the event that the polyolefin has a crystallinity of not less than 40%, and
   not lower than a temperature obtained by subtracting 15° C. from the melting point of the polyolefin and lower than the decomposition temperature of the polyolefin in the event that the polyolefin has a crystallinity of less than 40%.

6. The method of treating polyolefin as claimed in claim 2, wherein the heating temperature in the ligand-removal step is:
   not lower than the crystallization temperature of the polyolefin and not higher than the melting point of the polyolefin in the event that the polyolefin has a crystallinity of not less than 40%, and
   not lower than a temperature obtained by subtracting 15° C. from the melting point of the polyolefin and not higher than the melting point of the polyolefin in the event that the polyolefin has a crystallinity of less than 40%.

7. The method of treating polyolefin as claimed in claim 2, wherein the ligand-removal step is a step in which the polyolefin contacted with the ligand decomposer is heated at a temperature of not lower than the melting point of the polyolefin and lower than the decomposition temperature of the polyolefin, while applying a shear force to the polyolefin.

8. The method of treating polyolefin as claimed in claim 2, wherein the ligand-removal step is a step comprising:
   (a) a step of melting, by heating, the polyolefin contacted with the ligand decomposer to prepare pellets of the polyolefin, and
   any one of (b-1) a step of contacting the pellets with hot water, (b-2) a step of contacting the pellets with water vapor and (b-3) a step of maintaining the pellets at a pressure of 0.001 to 0.098 MPa.

9. The method of treating polyolefin as claimed in claim 2, wherein the ligand-removal step is a step in which the polyolefin contacted with the ligand decomposer is heated in a stream of inert gas.

10. The method of treating polyolefin as claimed in claim 2, wherein the ligands contained in the transition metal compound are selected from the group consisting of cyclopentadienyl group, substituted cyclopentadienyl group, indenyl group, substituted indenyl group, fluorenyl group, substituted fluorenyl group and a group wherein two ligands selected from the group consisting of cyclopentadienyl group, substituted cyclopentadienyl group, indenyl group, substituted indenyl group, fluorenyl group and substituted fluorenyl group are bonded through a divalent bonding group.

11. The method of treating polyolefin as claimed in claim 1, wherein the ligand decomposer is at least one compound selected from the group consisting of water, oxygen, alcohol, alkylene oxide and peroxide.

12. The method of treating polyolefin as claimed in claim 1, wherein the mean particle diameter of the polyolefin in the step of contacting polyolefin with a ligand decomposer is in the range of 50 to 5,000 µm.

13. The method of treating polyolefin as claimed in claim 1, wherein the step of heating the polyolefin contacted with the ligand decomposer is conducted at a temperature:

not lower than the crystallization temperature of the polyolefin and lower than the decomposition temperature of the polyolefin in the event that the polyolefin has a crystallinity of not less than 40%, and not lower than a temperature obtained by subtracting 15° C. from the melting point of the polyolefin and lower than the decomposition temperature of the polyolefin in the event that the polyolefin has a crystallinity of less than 40%.

14. The method of treating polyolefin as claimed in claim 1, wherein the step of heating the polyolefin contacted with the ligand decomposer is conducted at a temperature:

not lower than the crystallization temperature of the polyolefin and not higher than the melting point of the polyolefin in the event that the polyolefin has a crystallinity of not less than 40%, and not lower than a temperature obtained by subtracting 15° C. from the melting point of the polyolefin and not higher than the melting point of the polyolefin in the event that the polyolefin has a crystallinity of less than 40%.

15. The method of treating polyolefin as claimed in claim 1, wherein the step of heating the polyolefin contacted with the ligand decomposer is conducted at a temperature:

not lower than the melting point of the polyolefin and lower than the decomposition temperature of the polyolefin, while applying a shear force to the polyolefin.

16. The method of treating polyolefin as claimed in claim 1, wherein the step of heating the polyolefin contacted with the ligand decomposer is a step comprising:

(a) a step of melting, by heating, the polyolefin contacted with the ligand decomposer to prepare pellets of the polyolefin, and any one of (b-1) a step of contacting the pellets with hot water, (b-2) a step of contacting the pellets with water vapor and (b-3) a step of maintaining the pellets at a pressure of 0.001 to 0.098 MPa.

17. The method of treating polyolefin as claimed in claim 1, wherein the step of heating the polyolefin contacted with the ligand decomposer is a step in which the polyolefin contacted with the ligand decomposer is heated in a stream of inert gas.

18. The method as claimed in claim 1, wherein an amount of the ligand decomposer contained in the ligand decomposer-containing gas is in the range of 0.1 to 40% by weight.

19. The method as claimed in claim 2, wherein an amount of the ligand decomposer contained in the ligand decomposer-containing gas is in the range of 0.1 to 40% by weight.

20. The method as claimed in claim 1, wherein the contact of polyolefin with the ligand decomposer-containing gas is conducted substantially in the absence of liquid medium.

21. The method as claimed in claim 2, wherein the contact of polyolefin with the ligand decomposer-containing gas is conducted substantially in the absence of liquid medium.

22. A method of treating polyolefin, comprising:

(i) a step of contacting polyolefin, which is obtained by the use of a metallocene compound, with a ligand decomposer, and (ii) a step of heating the polyolefin contacted with the ligand decomposer, wherein the step of heating the polyolefin contacted with the ligand decomposer is conducted at a temperature not lower than the melting point of the polyolefin and lower than the decomposition temperature of the polyolefin, while applying a shear force to the polyolefin.

23. A method of treating polyolefin, comprising:

(i) a step of contacting polyolefin, which is obtained by the use of a metallocene compound, with a ligand decomposer, and (ii) a step of heating the polyolefin contacted with the ligand decomposer comprising:

(a) a step of melting, by heating, the polyolefin contacted with the ligand decomposer to prepare pellets of the polyolefin, and (b) any one of (b-1) a step of contacting the pellets with hot water, (b-2) a step of contacting the pellets with water vapor and (b-3) a step of maintaining the pellets at a pressure of 0.001 to 0.98 MPa.

24. A method of treating polyolefin, comprising:

(i) a ligand-decomposition step of contacting polyolefin, which is obtained by the use of a transition metal compound containing ligands having cyclopentadienyl skeleton, with a ligand decomposer to decompose the ligands contained in the polyolefin, and (ii) a ligand-removal step of heating the polyolefin contacted with the ligand decomposer to remove the decomposed ligands from the polyolefin, wherein the ligand-removal step of heating the polyolefin contacted with the ligand decomposer is conducted at a temperature not lower than the melting point of the polyolefin and lower than the decomposition temperature of the polyolefin, while applying a shear force to the polyolefin.

25. A method of treating polyolefin, comprising:

(i) a ligand-decomposition step of contacting polyolefin, which is obtained by the use of a transition metal compound containing ligands having cyclopentadienyl skeleton, with a ligand decomposer to decompose the ligands contained in the polyolefin, and (ii) a ligand-removal step of heating the polyolefin contacted with the ligand decomposer to remove the decomposed ligands from the polyolefin, wherein the ligand-removal step of heating the polyolefin contacted with the ligand decomposer comprises:

(a) a step of melting, by heating, the polyolefin contacted with the ligand decomposer to prepare pellets of the polyolefin, and (b) any one of (b-1) a step of contacting the pellets with hot water, (b-2) a step of contacting the pellets with water vapor and (b-3) a step of maintaining the pellets at a pressure of 0.001 to 0.098 MPa.

* * * * *